US005195060A

United States Patent [19]

Roll

[11] Patent Number: 5,195,060

[45] Date of Patent: Mar. 16, 1993

[54] SECURITY SYSTEM FOR SWIMMING POOLS AND LIKE BODIES OF WATER

[75] Inventor: Kenneth A. Roll, Kirtland, Ohio

[73] Assignee: Marcorp Inc., Fairfax, Va.

[21] Appl. No.: 804,338

[22] Filed: Dec. 10, 1991

[51] Int. Cl.[5] .............................................. G01S 3/80

[52] U.S. Cl. .................................. 367/118; 367/131; 367/136; 367/153; 367/157; 310/337; 340/566

[58] Field of Search .............. 367/118, 129, 131, 136, 367/141, 153, 155, 157, 910; 310/337; 340/566

[56] References Cited

U.S. PATENT DOCUMENTS 2,783,459 2/1957 Lienau et al. ....................... 340/258

4,747,085 5/1988 Dunegan et al. ..................... 367/93

4,932,009 5/1990 Lynch ............................... 367/153

*Primary Examiner*—J. Woodrow Eldred

*Attorney, Agent, or Firm*—Leydig, Voit & Mayer

[57] ABSTRACT

An apparatus for detecting a person in a body of water includes a transmitter for generating an electrical swept frequency signal having a frequency that continuously varies between upper and lower limits, at least one pair of transducers disposed in a body of water including a transmitting transducer connected to receive the swept frequency signal for launching a beam of acoustical waves in response to the swept frequency signal in the body of water and a receiving transducer disposed opposite the transmitting transducer for receiving the acoustical waves and for converting received acoustical waves into an electrical received signal, and a receiver connected to the receiving transducer for producing a detected signal in response to the received signal, for producing a threshold signal in response to the detected signal, and for initiating an alarm when the detected signal falls below the threshold for at least a predetermined length of time.

28 Claims, 3 Drawing Sheets

FIG.4(a) FIG.4(b) FIG.4(c) FIG.4(d)
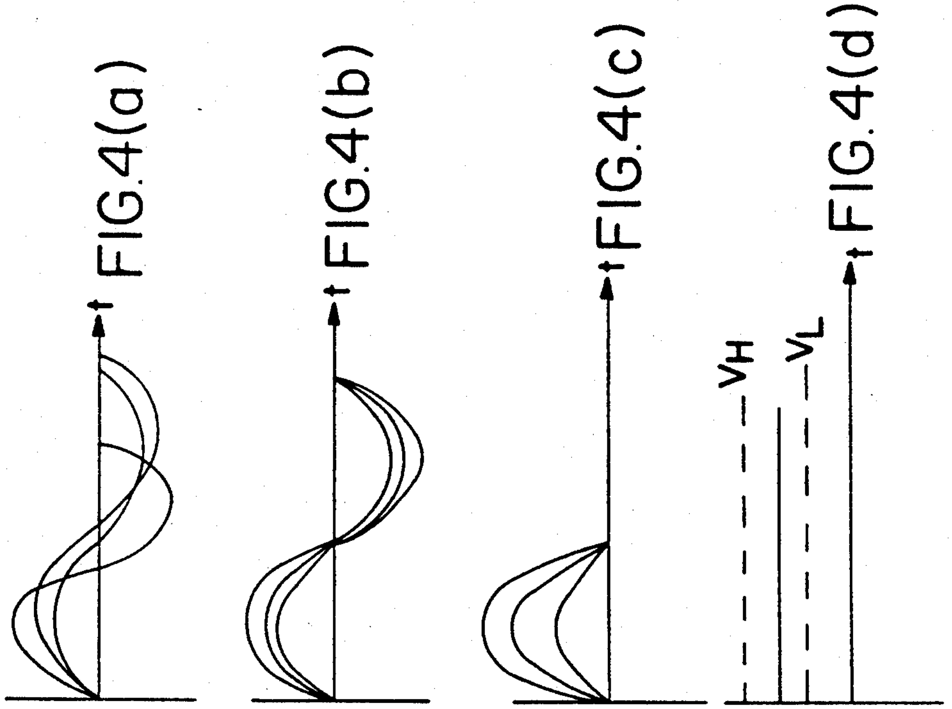
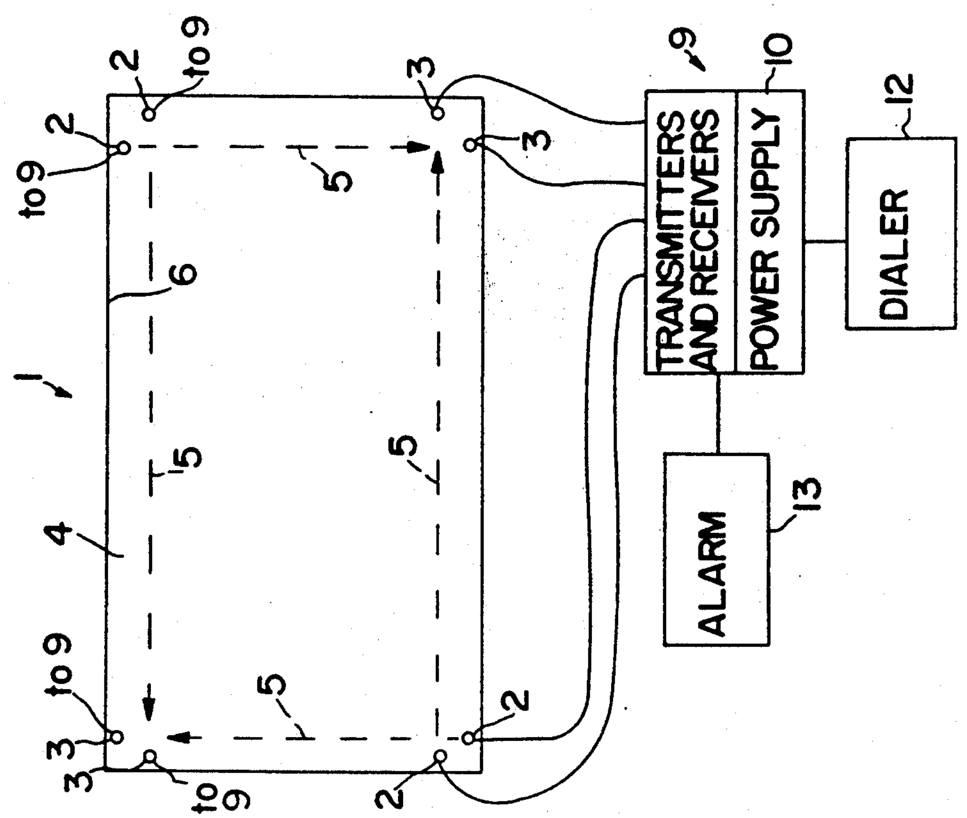
FIG.1

SECURITY SYSTEM FOR SWIMMING POOLS AND LIKE BODIES OF WATER

FIELD OF THE INVENTION

The present invention relates to an apparatus for detecting the presence of a person in a body of water and, more particularly, for detecting the presence of a person in an unattended swimming pool.

BACKGROUND OF THE INVENTION

Every year numerous accidents occur when people enter unattended swimming pools, for example, after normal operating hours, and drown or are injured. These unauthorized swimmers, besides risking personal injury, may engage in vandalism and property damage. Reliable detection of these intruders can prevent personal injury and property damage, significantly reducing swimming pool operating costs.

The detection of intruders in bodies of water used for swimming is complicated by the various shapes of those bodies of water. Such a body of water may range from a small whirlpool that accommodates no more than two or three people to a very large amusement park facility and even to a natural body of water, such as a lake or a portion of a river. An intrusion detection apparatus should, preferably, be readily adaptable to these various environments without significant modification of the apparatus. In addition, an intrusion apparatus should be relatively inexpensive and relatively free of false alarms. False alarms can be caused, particularly in outdoor swimming areas, by debris falling into the body of water, strong winds, and rain. These influences can produce variations in the surface of the water that resemble a person in the water, thus resulting in false alarms. For these reasons, the state of disturbance of the surface of a body of water is an unreliable indicator of the presence of a person in the body of water. Likewise, acoustical devices, such as hydrophones, that merely listen for underwater sounds related to swimming are inherently limited in sensitivity by the movement of water, for example, through constantly operating filtration and pumping equipment in a swimming pool or by currents in a natural body of water. These sources of sound can also trigger false alarms.

Specific apparatus for detection of the presence of persons in a body of water through sensing changes in acoustical waves are disclosed in U.S. Pat. Nos. 2,783,459, 4,747,085, and 4,932,009. U.S. Pat. Nos. 2,783,459 and 4,932,009 are particularly directed to specifying not only the presence of a person in a body of water but also the location of that person within the body of water. Therefore, these systems are relatively complex and expensive. The portable apparatus described in U.S. Pat. No. 4,747,085 depends upon the establishment of a quiescent, static acoustical wave pattern within a body of water. Disturbance of the static pattern triggers an alarm, relying on the Doppler effect, i.e., a change in the frequency of a received signal as compared to the frequency of the originating acoustical signal. Such a system is susceptible to false alarms when large variations occur in the surface of the water. Moreover, the complex Doppler effect signal processing circuitry employed in the apparatus is relatively expensive.

SUMMARY OF THE INVENTION

The principal object of the present invention is to provide a simple and economical apparatus for detecting the presence of a person in an unattended body of water.

A further object of the invention is to detect the presence of persons in a body of water without producing false alarms.

According to one aspect of the invention, an apparatus for detecting a person in a body of water includes means for generating an electrical swept frequency signal having a frequency that continuously varies between upper and lower limits, at least one pair of transducers disposed in a body of water including a transmitting transducer connected to receive the swept frequency signal for launching a beam of acoustical waves in response to the swept frequency signal in the body of water and a receiving transducer disposed opposite the transmitting transducer for receiving the acoustical waves and for converting received acoustical waves into an electrical received signal, and means connected to the receiving transducer for producing a detected signal in response to the received signal and for initiating an alarm when the detected signal falls below a threshold for at least a predetermined length of time.

According to another aspect of the invention, an apparatus for detecting a person in a body of water includes means for generating an electrical transmission signal, at least one pair of transducers disposed in a body of water including a transmitting transducer connected to receive the electrical transmission signal for launching a beam of acoustical waves in response to the electrical transmission signal in the body of water and a receiving transducer disposed opposite the transmitting transducer for receiving the acoustical waves and for converting received acoustical waves into an electrical received signal, and means connected to the receiving transducer for producing a detected signal in response to the received signal, for producing a threshold signal in response to the detected signal, and for initiating an alarm when the detected signal falls below the threshold signal for at least a predetermined length of time.

BRIEF DESCRIPTION OF THE DRAWINGS

FIG. 1 is a schematic diagram of a security system according to an embodiment of the invention.

FIGS. 4(*a*)–4(*d*) are waveforms of various signals in a receiving portion of the apparatus shown in FIG. 1.

DETAILED DESCRIPTION OF PREFERRED EMBODIMENTS

Figure 2:
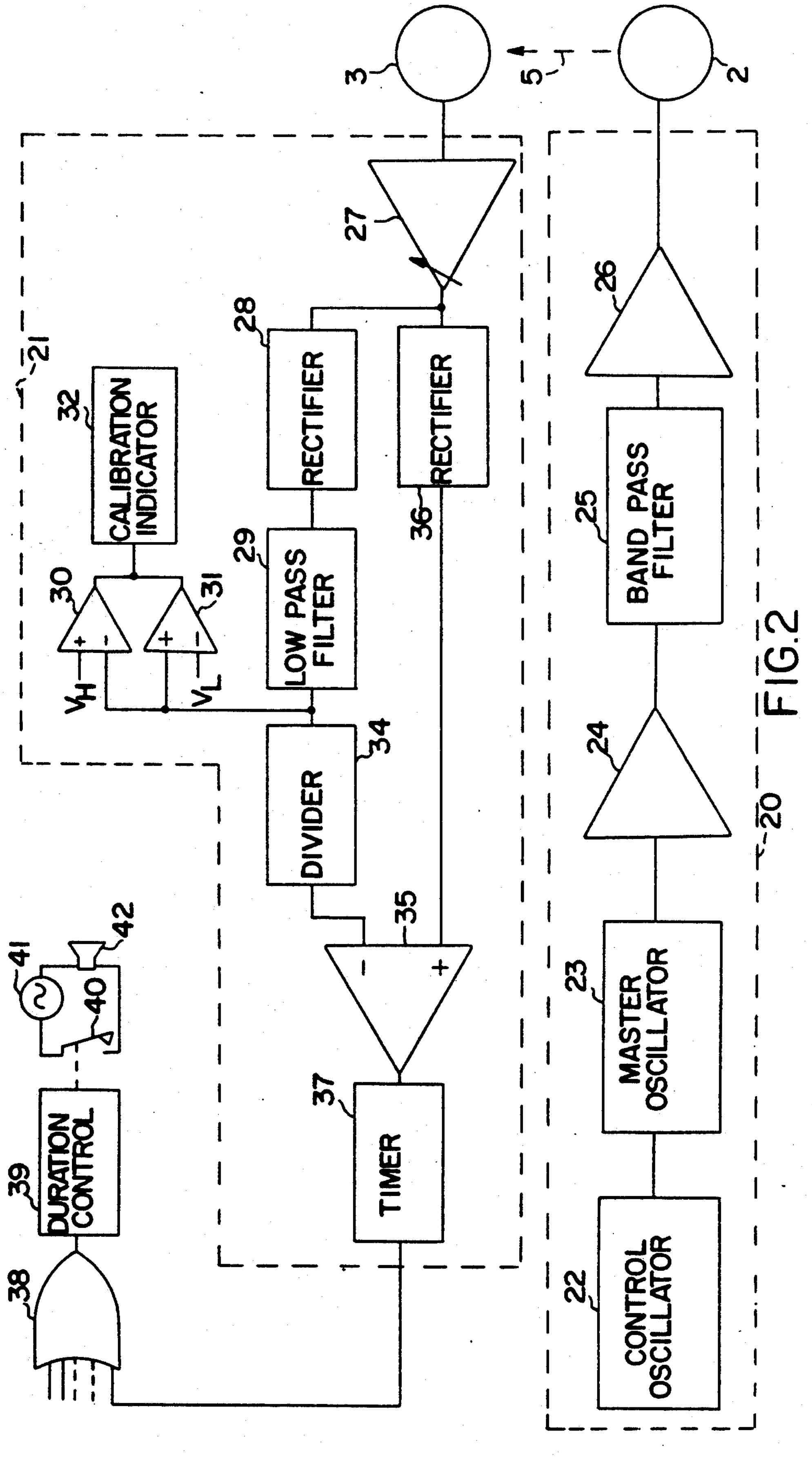
FIG. 2 is a block diagram of a circuit that may be used in the embodiment of the invention shown in FIG. 1.

An embodiment of a security system 1 for a body of water according to the invention is schematically shown in FIG. 1. For simplicity of description, an embodiment of the system as applied to a rectangular swimming pool is shown. However, the invention is readily usable with pools of different and irregular shapes and with at least parts of natural bodies of water. The security system 1 includes a plurality of acoustical transducers 2 and 3 located at the periphery of a pool 4 below the water level in the pool 4. The transducers 2 and 3 are identical and each can act as a transmitter or receiver of acoustical waves, converting an electrical driving signal into acoustical waves and vice-versa. However, in a preferred embodiment of the invention, the transmitting transducers 2 are dedicated to launching acoustical waves into the water within the pool 4 in response to an electrical driving signal, and the receiving transducers 3 are dedicated to generating electrical signals in response to incident acoustical waves, i.e., to detecting or sensing incident acoustical waves.

Each transmitting transducer 2 is located at one side of the rectangular pool 4 and a corresponding receiving transducer 3 is located directly opposite the respective transmitting transducer. Together, each pair of transmitting and receiving transducers 2 and 3 defines a channel along which a beam 5 of acoustical waves travels from a transmitting transducer to the corresponding receiving transducer. In the security system 1 of FIG. 1, there are four such channels, one channel being located at a distance from each of the side walls of the rectangular pool 4. In a small pool, such as a whirlpool, only a single channel may need to be employed to detect a person in the pool. In pools of complex shapes, various numbers of channels in accordance with the invention are employed in order to provide channels producing a perimeter of acoustical wave beams that are likely to be interrupted by a person entering or within the pool or body of water. In a natural body of water, a similar perimeter guard is established, defining the area guarded. In the rectangular pool 4, it is preferred, but not required, that pairs of transmitting transducers 2 and pairs of receiving transducers 3 are disposed near each other, i.e., in respective corners of the pool 4. This arrangement, in which transmitting transducers are close to each other, receiving transducers are close to each other, and receiving and transmitting transducers are remote from each other, reduces crosstalk and other kinds of interference. In a rectangular pool with this arrangement, all transmitting transducers lie proximate one diagonal of the pool and all receiving transducers lie along another diagonal of the pool.

The transmitting and receiving transducers 2 and 3 are preferably located near and spaced from the side walls 6 of the pool 4 by a distance of about 1 to 1.7 meters (3 to 5 feet). A similar spacing is provided for the area of a natural body of water to be kept under surveillance. In unusually shaped bodies of water, a similar spacing is provided, arranged to intercept persons entering or already in the body of water. In a swimming pool, the transducers 2 and 3 are typically located at a depth of 25 to 30 centimeters (10 to 12 inches) below the level of the water in the pool 4.

A control unit 9 includes a power supply 10 for supplying power to transmitters and receivers connected to the respective transmitting transducer 2 and receiving transducer 3 of a channel. (While the control unit 9 is shown as a separate element, its power supply could be a battery located, with a transmitter or receiver, proximate the respective transducers to reduce the quantity and length of wiring in and near the body of water.) A transmitter and receiver, as described in further detail below, are provided for each channel. In addition, the power supply 10 supplies power to an optional automatic telephone dialer 12 and/or an alarm 13 in response to an interruption of a beam 5 of acoustical waves propagating between transmitting and receiving transducers in a channel. The alarm may include activation of lights in the area of the body of water, a sound alarm, or both, and an automatic telephone dialer, if present, may summon security personnel by telephone since the interruption of the acoustic beam indicates a high probability that a person has entered the pool and interrupted an acoustical beam.

In the invention, the transmitters generate an energizing signal that is applied to the transmitting transducers 2. The energy signal has an important characteristic that is part of the acoustical beam and part of the electrical signal produced by the corresponding receiving transducer 3. The transmitter produces an energizing signal that continuously varies in frequency with time between first and second frequency limits. Thus, the energizing signal is a swept frequency signal that continuously sweeps from one frequency to another in a repetitive pattern. The same swept frequency variation appears in the acoustical beam. The swept frequency signal helps avoid false alarms that can result from reflections and refractions of the acoustical waves within the water, particularly when the water is moving and the surface of the water is unsettled.

FIG. 2 is a detailed block diagram of an embodiment of one channel of a security system according to the invention. In FIG. 2, a transmitter 20 supplies a swept frequency energizing signal to the transmitting transducer 2 to produce an acoustical beam 5. The receiving transducer 3 receives the acoustical beam 5 and converts it to a detected signal that is input to a receiver 21.

Figures 3A, 3B, 3C, 3D:
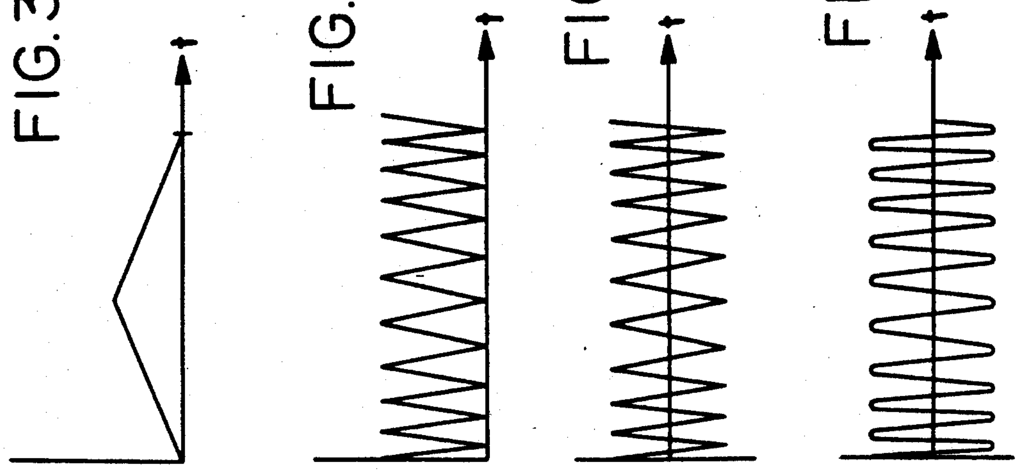
FIGS. 3(*a*)–3(*d*) are waveforms of various signals in a transmitting portion of the apparatus shown in FIG. 1.

The transmitter 20 includes a control oscillator 22 that produces an oscillatory signal at a relatively low frequency. In a preferred embodiment, the control oscillator oscillates at a fixed frequency between 100 Hz and 30 Khz, producing a saw-tooth waveform as shown in FIG. 3(*a*). The modulating signal from the control oscillator 22 is input into a control voltage terminal of a master oscillator 23. The master oscillator 23 produces a variable frequency signal having a frequency proportional to the magnitude of the voltage applied to the control voltage terminal. As the magnitude of the modulation signal from the control oscillator 22 increases, the frequency of the signal produced by the master oscillator decreases in frequency and vice-versa as indicated in FIG. 3(*b*). The frequency of the master oscillator 23 is much higher than the frequency of the modulation signal produced by the control oscillator 22, for example, from 1 kHz to 400 kHz. The control oscillator 22 continuously varies the frequency of the signal produced by the master oscillator 23 within a fixed range, i.e., between first and second frequency limits. For example, if the master oscillator has a base frequency of about 300 kHz, the control oscillator 22 may vary the frequency of the master oscillator plus or minus 30 kHz, i.e., from about 270 kHz to 330 kHz. In other words, in this example, the swept frequency signal has frequencies that continuously sweep between 270 kHz and 330 kHz at a rate determined by the frequency of the modulation signal produced by the control oscillator 22.

The swept frequency signal from the master oscillator 23 is fed to a unity gain buffer amplifier 24 that adjusts the swept frequency signal to an average magnitude of about zero volts, as shown in FIG. 3(*c*). A bandpass filter 25 receives the buffered signal from the amplifier 24 and removes high frequency components, producing a smoothed waveform, as illustrated in FIG. 3(*d*). The smoothed swept frequency signal is applied as the energizing signal, after passing through a power amplifier 26, to the transmitting transducer 2. The smoothing of the swept frequency signal in the bandpass filter 25 and the bandpass filter 25 are not essential to the system.

In response to the energizing signal produced by the power amplifier 26, the transmitting transducer 2 launches a beam 5 of acoustical waves through the pool 4 in the direction of the receiving transducer 3. The acoustical waves received by the receiving transducer 3 are converted into an electrical detected signal. FIG. 4(*a*) is a representation of various frequency components of the transmitted signal. The components of the transmitted signal have different frequencies because of the swept frequency characteristic of the signal.

The receiving transducer 3 is, like the transmitting transducer 2, a relatively high Q, i.e., frequency selective, element, resonant at a particular frequency within the range of swept frequencies. Although the transmitting transducer 2 is driven directly by an electrical signal, the receiving transducer is only responsive to incident acoustical waves. Thus, the receiving transducer "rings" only at its resonant frequency. The components of the swept frequency signal that differ from the resonant frequency of the receiving transducer result in a detected signal of lower amplitude than the frequency component matching the resonant frequency of the receiving transducer. The important feature, however, is that a detected signal is generated whenever parts of the swept frequency acoustical wave beam 5 is received, even if some of the beam's frequency components are attenuated or lost in transmission through the body of water.

The detected signal from the receiving transducer 3 is amplified by a variable gain amplifier 27, producing an amplified detected signal, a representation of some of the components of which are shown in FIG. 4(*b*). All components have substantially the same frequency but different amplitudes based on the frequency selectivity of the receiving transducer 3. The gain of the amplifier 27 can be varied, for example, between about 10 and 5,500, to conform the operation of the system to the size of the body of water in which it is installed. The larger the distance separation between the transmitting transducer 2 and the receiving transducer 3 in a channel, the more attenuation occurs in the transmission of the acoustical wave beam between them. The gain of the variable gain amplifier 27 is adjusted to compensate for the losses in the propagation of the acoustical wave beam that depend on the length of the channel.

The receiver 21 includes a calibration section for adjusting the gain of the variable gain amplifier 27 to a value that provides an amplified detected signal at the output of the variable gain amplifier having a magnitude suitable for processing in the receiver 21. The calibration section includes a first rectifier 28 that receives and rectifies the amplified detected signal, producing an output signal having the components shown in FIG. 4(*c*). A low pass filter 29 smooths the rectified signal, essentially producing a DC signal having a magnitude corresponding to the magnitude of the amplified detected signal that lies between thresholds $V_H$ and $V_L$, as indicated in FIG. 4(*d*). That filtered DC signal is applied to negative sense and positive sense inputs of first and second comparators 30 and 31, respectively, to determine whether the magnitude of the DC signal falls within a desired magnitude range. The DC signal is input to the negative terminal of the comparator 30 which receives a first threshold $V_H$ at the positive sense terminal. The DC signal is also applied to the positive sense terminal of the comparator 31 and a second threshold voltage $V_L$ is applied to the negative sense terminal of the comparator 31. Thus, the comparator 30 compares the magnitude of the DC signal to an upper threshold, $V_H$, the comparator 31 compares the magnitude of the DC signal to a lower threshold, $V_L$. The output signals from the comparators 30 and 31 are supplied to a calibration indicator 32 which may include a light source, such as a light emitting diode, that is turned on and off in response to the comparison.

In a preferred embodiment, the light source of the calibration indicator 32 remains on when the magnitude of the DC signal falls within the desired range. Thus, calibration is carried out when an acoustical wave is being received by the receiving transducer 3. The gain of the variable gain amplifier 27 is separately adjusted in opposite directions to each of two extreme positions where the light of the calibration indicator 32 is just extinguished. Then the gain of the amplifier 27 is adjusted to a position intermediate those two extreme positions of the preferred gain range. In a preferred embodiment, the first threshold $V_H$ is set at about 7 volts and the second threshold $V_L$ is set at about 5 volts. The calibration avoids distortion that can occur in the receiver when the magnitude of the amplified detected signal is too large yet ensures that an amplified detected signal of sufficient magnitude for accurate signal processing is produced by the amplifier 27. Although a manually calibrated apparatus has been described, one of skill in the art could easily substitute circuitry automatically calibrating the gain of the amplifier 27.

In the receiver 21, the DC signal voltage from the low pass filter 29 is divided by a voltage divider 34 into a divided DC signal, i.e., a signal of lower magnitude. The divided DC signal is input into a negative sense terminal of an alarm comparator 35. The capacitance of the low pass filter 29 maintains the divided DC signal at a relatively high voltage level for a fixed period of time even after a detected signal is no longer received by the receiver 21.

The amplified detected signal from the variable gain amplifier 27 is also applied to a second rectifier 36. The rectified signal from rectifier 36 is applied to the positive sense terminal of the alarm comparator 35. The alarm comparator 35 outputs a pulsed reset signal based upon the difference between the magnitudes of the two signals applied to its input terminals. That pulsed reset signal is supplied to a one-shot timer 37. Under appropriate conditions, described below, the one-shot timer 37 outputs an alarm signal to an OR gate 38.

The receiver 21 incorporates a "floating" threshold in determining whether an acoustical wave beam 5 has been interrupted. It has been found that, over time, the acoustical propagation conditions in a body of water can vary significantly, causing large variations in the magnitude of the detected signal. If the magnitude of that detected signal is compared to a fixed threshold, many false alarms, produced by the variations in propagation conditions, will occur. These false alarms are avoided in the invention by using a floating threshold that varies with the magnitude of the detected signal. That threshold is the divided DC signal from the divider 34. When the magnitude of the detected signal changes, the magnitude of the divided signal changes at a rate that depends upon the frequency response characteristics of the low pass filter 29.

The transmitter 20 and the receiver 21 of FIG. 2 represent an arrangement for a single pair of transducers, i.e., a single channel, in a body of water. Where multiple pairs of transducers are used, for example, the four pairs of transducers used in the embodiment of FIG. 1, four transmitters and four receivers are used. Each of those four receivers potentially produces an alarm signal. The OR gate 38 receives alarm signals from each of the receivers that is used in a single body of water or a swimming pool 4. The output signal from the OR gate 38, indicating an alarm, is latched by an alarm duration control 39 for use by various alarm mechanisms, such as a siren, lighting, an automatic telephone dialer, and the like. In the embodiment of FIG. 2, an alarm hold signal produced by the alarm duration control 39 triggers a relay 40 which, in turn, connects a power source 41 to a siren 42.

Figures 5A, 5B, 5C, 5D:
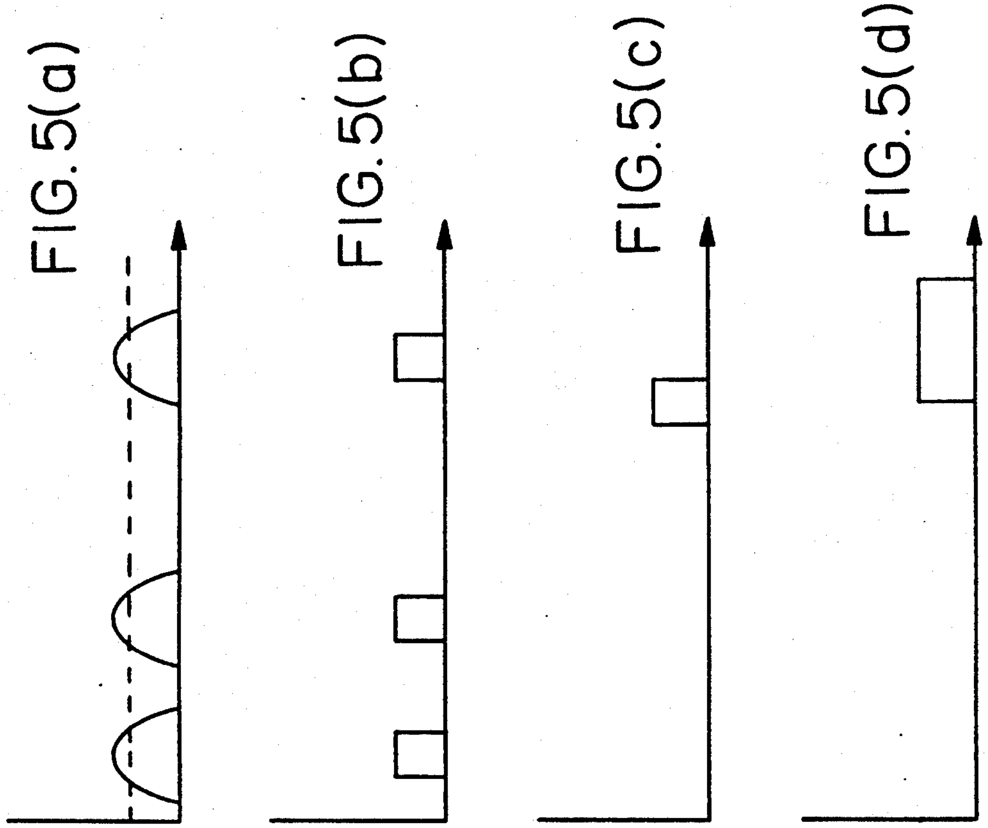
FIGS. 5(*a*)–5(*d*) are waveforms of various signals in a receiving portion of the apparatus shown in FIG. 1.

The operation of the receiver 21 in triggering or not triggering an alarm is best understood with reference to FIGS. 5(*a*)–5(*d*). The alarm comparator 35 compares the magnitude of the divided DC signal, i.e., the variable threshold represented by the broken line in FIG. 5(*a*), with the magnitude of the rectified signal produced by the rectifier 36, the signal represented by the solid lines in FIG. 5(*a*). The alarm comparator outputs a reset signal while the magnitude of the rectified signal exceeds the magnitude of the divided DC signal. Because the rectified signal is periodic, the reset signal is pulsed. The duration of the reset signal pulses and the length of the time interval between successive reset pulses is determined by the magnitude and frequency of the signal detected in the receiver 21. Each successive reset signal pulse resets the one-shot timer 37 so that the timer does not "time out", i.e., does not generate an alarm signal, in response to continuously incoming reset signal pulses. In this way, the timer 37 measures or times the interval between pulses. The expiration of the time out period without reception of a reset pulse signal results in the generation of an alarm signal as illustrated in FIGS. 5(*b*) and 5(*c*), respectively. In a preferred embodiment, the one-shot timer 37 is preferably adjusted to time out if it has not received a pulse for about 100 milliseconds. In response to the alarm signal generated as indicated in FIG. 5(*c*) by timer 37, the alarm hold signal shown in FIG. 5(*d*) is generated by the alarm duration control 39 as previously described.

If a person is present in the body of water, he will interrupt the continuous acoustical wave beam between a pair of transmitting and receiving transducers and the detected signal at the receiver connected to the receiving transducer will be interrupted. Likewise, the amplified detected signal and the rectified signal will both be interrupted. The divided DC signal is sustained in magnitude for a length of time because of the capacitance of the low pass filter 29. However, the rectified signal from rectifier 36 cannot exceed the divided DC signal when the acoustical wave beam is interrupted. Thus, for the interval of the interruption, no reset signal pulse or pulses will be generated, the one-shot timer 37 will time out, after the predetermined period, and an alarm signal will be generated. The alarm signal will continue to be generated until the interruption of the acoustical wave beam ceases. The interruption can be relatively short in the case of an individual swimming or diving through the acoustical beam.

Alarm signals from all pairs of the transducers, i.e., channels, in a system are combined at the OR gate 38 so that if any of the beams of a multiple beam system are interrupted, an alarm is triggered. The alarm duration control 39 receives any alarm signal through the OR gate 38 and maintains the alarm signal for a predetermined length of time, even though the acoustical wave beam interruption ends, while all alarm responsive elements function. In a single embodiment of the invention, for example, in a small whirlpool, only one pair of transducers is employed so that OR gate 38 for combining alarm signals from different channels, i.e., pairs of transducers, is not required.

In the invention, in which a swept frequency signal is employed, the acoustical beam contains signals at each of the frequencies within the swept frequency range as described with respect to FIG. 4(*a*). Reflections and refractions of acoustical waves of certain wavelengths, i.e., frequencies, are believed to occur within a body of water, for example, because of variations of the surface of the water, cancelling some of the frequency components in the acoustical wave. In a single frequency acoustical wave beam, that wave cancellation is the same as an interruption of the beam and can produce a false alarm. However, in the invention, because many frequency components are present, even if some of the frequency components are cancelled because of variations in the acoustical propagation conditions within the water or because of variations of the surface of the water, other frequency components reach the receiving transducer 3 and produce a detected signal. The reception of any of the components is satisfactory to avoid the triggering of an alarm and thereby prevent false alarms. In addition, the floating threshold signal employed in the invention resists false alarms. Thus, the system reliably detects entry of persons into bodies of water without false alarms.

The receiver and transmitter described can be constructed from readily available integrated circuits. For example, the control and master oscillators and the alarm duration control can be conventional 555 integrated circuit timers. In the control and master oscillators, the output signals are preferably taken from the threshold pins rather than from the conventional Q terminals when 555 timers are used. Alternative circuitry can be employed. For example, the control and master oscillator can be a single, commercially available, integrated circuit that is substantially more expensive than the 555 timers. The bandpass filter 25, if present, may employ an operational amplifier. The rectifier 36 may be omitted if the comparator 35 can accept both positive and negative sense inputs, although further adjustment of the pulsed reset signal from the comparator 35 may be necessary in that case. Rectifiers 28 and 36, if used, can also be fullwave rectifiers, doubling the pulse rate of the pulsed reset signal and the threshold level unless other changes are made. In any event, the receiver and the transmitter can be easily built from conventional components.

The invention has been described with respect to certain preferred embodiments. Modifications and additions within the spirit of the invention will occur to those of skill in the art. Accordingly, the scope of the invention is limited solely by the following claims.

I claim:

1. An apparatus for detecting a person in a body of water comprising:

means for generating an electrical swept frequency signal having a frequency that continuously varies between upper and lower limits;

at least one pair of transducers disposed in a body of water including a transmitting transducer connected to receive the swept frequency signal for launching a beam of acoustical waves in response to the swept frequency signal in the body of water and a receiving transducer disposed opposite the transmitting transducer for receiving the acoustical waves and for converting received acoustical waves into an electrical received signal; and means connected to the receiving transducer for producing a detected signal in response to the received signal and for initiating an alarm when the detected signal falls below a threshold for at least a predetermined length of time.

2. The apparatus of claim 1 including four pairs of transducers, one of each pair of transducers being located at each of four spaced apart locations, two receiving transducers being located adjacent each of two of the locations and two transmitting transducers being located adjacent each of the other two locations.

3. The apparatus of claim 1 wherein the means for generating comprises a first oscillator for generating a modulating signal having a first frequency and a variable magnitude and a second oscillator connected to the first oscillator for generating a variable frequency signal having a frequency varying in response to the magnitude of the modulating signal as the swept frequency signal wherein the variable frequency signal has a higher frequency than the first frequency.

4. The apparatus of claim 3 wherein the means for generating comprises a bandpass filter receiving the variable frequency signal for eliminating undesired frequency components from the variable frequency signal and thereby producing the swept frequency signal.

5. The apparatus of claim 1 wherein the means for initiating comprises means for comparing the detected signal to the threshold and for generating a reset signal pulse while the detected signal exceeds the threshold and means for detecting an interruption in reset signal pulses.

6. The apparatus of claim 5 including means for generating the threshold comprising a rectifier receiving the detected signal and producing a rectified detected signal and a low pass filter receiving the rectified detected signal and producing the threshold.

7. The apparatus of claim 5 wherein the means for comparing comprises a comparator receiving the threshold and the detected signal.

8. The apparatus of claim 5 wherein the means for detecting an interruption in the pulsed reset signal pulses comprises a timer for timing an interval between consecutive reset signal pulses.

9. The apparatus of claim 1 wherein the means for producing includes calibration means for indicating whether the detected signal is within a predetermined range and a variable gain amplifier for adjusting the detected signal to the predetermined range.

10. The apparatus of claim 9 wherein the calibration means comprises:

means for rectifying the detected signal;

a low pass filter for filtering the rectified detected signal and thereby producing a DC signal;

a first comparator receiving the DC signal and a first calibration threshold for determining whether the DC signal exceeds the first calibration threshold;

a second comparator receiving the DC signal and a second calibration threshold for determining whether the DC signal is less than the second calibration threshold; and means connected to the first and second comparators for indicating whether the DC signal lies between the first and second calibration thresholds.

11. An apparatus for detecting a person in a body of water comprising:

means for generating an electrical transmission signal;

at least one pair of transducers disposed in a body of water including a transmitting transducer connected to receive the electrical transmission signal for launching a beam of acoustical waves in response to the electrical transmission signal in the body of water and a receiving transducer disposed opposite the transmitting transducer for receiving the acoustical waves and for converting received acoustical waves into an electrical received signal; and means connected to the receiving transducer for producing a detected signal in response to the received signal, for producing a threshold signal in response to and determined by the detected signal, and for initiating an alarm when the detected signal falls below the threshold signal for at least a predetermined length of time.

12. The apparatus of claim 11 including four pairs of transducers, one pair of transducers being located adjacent each of four different locations, two transducers located adjacent each of two of the four locations being receiving transducers and two transducers located adjacent each of the other two of the four locations being transmitting transducers.

13. The apparatus of claim 11 wherein the means for generating comprises a first oscillator for generating a modulating signal having a first frequency and a variable magnitude and a second oscillator connected to the first oscillator for generating a variable frequency signal having a frequency varying in response to the magnitude of the modulating signal as a swept frequency signal wherein the variable frequency signal has a higher frequency than the first frequency.

14. The apparatus of claim 13 wherein the means for generating comprises a bandpass filter receiving the variable frequency signal for eliminating undesired frequency components from the variable frequency signal and thereby producing the swept frequency signal.

15. The apparatus of claim 11 wherein the means for producing the threshold signal comprises a rectifier receiving the detected signal and producing a rectified detected signal and a low pass filter receiving the rectified detected signal and producing the threshold signal.

16. The apparatus of claim 11 wherein the means for initiating comprises means for comparing the detected signal to the threshold signal and for generating a reset signal pulse while the detected signal exceeds the threshold signal and means for detecting an interruption in reset signal pulses.

17. The apparatus of claim 16 wherein the means for detecting an interruption in the pulsed reset signal pulses comprises a timer for timing an interval between consecutive reset signal pulses.

18. The apparatus of claim 16 wherein the means for comparing comprises a comparator receiving the threshold signal and the detected signal.

19. The apparatus of claim 11 wherein the means for producing a detected signal includes calibration means for indicating whether the detected signal is within a predetermined range and a variable gain amplifier for adjusting the detected signal to the predetermined range.

20. The apparatus of claim 19 wherein the calibration means comprises:

means for rectifying the detected signal;

a low pass filter for filtering the rectified detected signal and thereby producing a DC signal;

a first comparator receiving the DC signal and a first calibration threshold for determining whether the DC signal exceeds the first calibration threshold;

a second comparator receiving the DC signal and a second calibration threshold for determining whether the DC signal is less than the second calibration threshold; and means connected to the first and second comparators for indicating whether the DC signal lies between the first and second calibration thresholds.

21. An apparatus for detecting a person in a body of water comprising:

means for generating an electrical transmission signal;

at least one pair of transducers disposed in a body of water including a transmitting transducer connected to receive the electrical transmission signal for launching a beam of acoustical waves in response to the electrical transmission signal in the body of water and a receiving transducer disposed opposite the transmitting transducer for receiving the acoustical waves and for converting received acoustical waves into an electrical received signal having a magnitude indicative of received acoustical wave intensity; and means connected to the receiving transducer for producing a detected signal in response to the received signal, the detected signal having a magnitude indicative of the magnitude of the received signal, for producing a threshold signal having a magnitude varying in response to the magnitude of the detected signal, and for initiating an alarm when the magnitude of the detected signal falls below the magnitude of the threshold signal for at least a predetermined length of time.

22. The apparatus of claim 21 wherein the means for generating comprises a first oscillator for generating a modulating signal having a first frequency and a variable magnitude and a second oscillator connected to the first oscillator for generating a variable frequency signal having a frequency varying in response to the magnitude of the modulating signal as a swept frequency signal wherein the variable frequency signal has a higher frequency than the first frequency.

23. The apparatus of claim 22 wherein the means for generating comprises a bandpass filter receiving the variable frequency signal for eliminating undesired frequency components from the variable frequency signal and thereby producing the swept frequency signal.

24. The apparatus of claim 21 wherein the means for producing the threshold signal having a variable magnitude comprises a rectifier receiving the detected signal and producing a rectified detected signal and a low pass filter receiving the rectified detected signal and producing the threshold signal.

25. The apparatus of claim 21 wherein the means for initiating comprises means for comparing the magnitude of the detected signal to the magnitude of the threshold signal and for generating a reset signal pulse while the magnitude of the detected signal exceeds the magnitude of the threshold signal and means for detecting an interruption in reset signal pulses.

26. The apparatus of claim 25 wherein the means for detecting an interruption in the pulsed reset signal pulses comprises a timer for timing an interval between consecutive reset signal pulses.

27. The apparatus of claim 25 wherein the means for comparing comprises a comparator receiving the threshold signal and the detected signal.

28. An apparatus for detecting a person in a body of water comprising:

means for generating an electrical swept frequency signal having a frequency that continuously varies between upper and lower limits;

at least one pair of transducers disposed in a body of water including a transmitting transducer connected to receive the swept frequency signal for launching a beam of acoustical waves in response to the swept frequency signal in the body of water and a receiving transducer disposed opposite the transmitting transducer for receiving the acoustical waves and for converting received acoustical waves into an electrical received signal having a magnitude indicative of received acoustical wave intensity; and means connected to the receiving transducer for producing a detected signal in response to the received signal, the detected signal having a magnitude indicative of the magnitude of the received signal, for producing a threshold signal having a magnitude varying in response to the magnitude of the detected signal, and for initiating an alarm when the magnitude of the detected signal falls below the magnitude of the threshold for at least a predetermined length of time.

* * * * *